United States Patent
Simpkins et al.

(10) Patent No.: US 9,866,556 B2
(45) Date of Patent: *Jan. 9, 2018

(54) COMMON INTERNET FILE SYSTEM PROXY AUTHENTICATION OF MULTIPLE SERVERS

(71) Applicant: Cisco Technology, Inc., San Jose, CA (US)

(72) Inventors: Richard Adam Simpkins, Sunnyvale, CA (US); Matthew Eric Seitz, San Jose, CA (US); Zuwei Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/092,860

(22) Filed: Apr. 7, 2016

(65) Prior Publication Data
US 2017/0026372 A1    Jan. 26, 2017

Related U.S. Application Data

(63) Continuation of application No. 12/403,284, filed on Mar. 12, 2009, now Pat. No. 9,338,165.

(51) Int. Cl.
*H04L 9/32* (2006.01)
*G06F 21/62* (2013.01)
(Continued)

(52) U.S. Cl.
CPC .... *H04L 63/0884* (2013.01); *G06F 17/30194* (2013.01); *G06F 21/33* (2013.01);
(Continued)

(58) Field of Classification Search
CPC ... H04L 63/0884; H04L 63/083; H04L 67/06; H04L 67/1002; H04L 63/0281;
(Continued)

(56) References Cited

U.S. PATENT DOCUMENTS 5,987,506 A * 11/1999 Carter ............... G06F 9/5016
707/999.01
6,026,414 A * 2/2000 Anglin .............. G06F 11/1456
(Continued)

OTHER PUBLICATIONS

Johansson, "How to Shoot Yourself in the Foot with Security Part 1", Microsoft Technet (Sep. 2005).*
(Continued)

*Primary Examiner* — Theodore C Parsons
(74) *Attorney, Agent, or Firm* — Patterson + Sheridan, LLP (57) ABSTRACT

Techniques are described for a proxy system to provide a client device with transparent access to multiple network file servers. The proxy system may appear to the client device as a single network file server. The proxy may be configured to forward requests received from the client device to multiple servers as well as provide responses from the server back to the client. Further, the proxy system may authenticate itself, as the client, to each of the multiple network servers using authentication credentials supplied by the client. After prompting a user to submit credentials to establish a session with a first network server, the proxy system may send a session timeout error code, prompting the client to submit a fresh authentication request used by the proxy system to establish a session with a second network server.

21 Claims, 10 Drawing Sheets

(51) Int. Cl.
  *H04L 29/06* (2006.01)
  *G06F 21/33* (2013.01)
  *H04L 29/08* (2006.01)
  *G06F 17/30* (2006.01)
  *G06F 21/31* (2013.01)

(52) U.S. Cl.
  CPC ...... *G06F 21/6218* (2013.01); *H04L 63/0281* (2013.01); *H04L 63/08* (2013.01); *H04L 63/083* (2013.01); *H04L 67/06* (2013.01); *H04L 67/1002* (2013.01); *G06F 21/31* (2013.01); *H04L 67/141* (2013.01); *H04L 67/42* (2013.01)

(58) Field of Classification Search
  CPC ....... H04L 63/08; H04L 67/141; H04L 67/42; H04L 67/1097; H04L 67/28; G06F 17/30194; G06F 21/6218; G06F 21/33; G06F 21/31; G06F 17/30197; G06F 21/335
  See application file for complete search history.

(56) References Cited

U.S. PATENT DOCUMENTS

| | | | |
|---|---|---|---|
| 7,254,636 B1* | 8/2007 | O'Toole, Jr. | G06F 17/30067 707/999.008 |
| 7,475,142 B2* | 1/2009 | Sharma | G06F 17/30197 707/E17.01 |
| 2004/0168054 A1* | 8/2004 | Halasz | H04L 63/08 713/155 |
| 2004/0255048 A1* | 12/2004 | Lev Ran | G06F 9/546 709/249 |
| 2005/0033988 A1* | 2/2005 | Chandrashekhar | H04L 63/0435 726/4 |
| 2005/0114701 A1* | 5/2005 | Atkins | H04L 63/08 726/4 |
| 2005/0125503 A1* | 6/2005 | Iyengar | H04L 63/08 709/213 |
| 2005/0210072 A1* | 9/2005 | Bojinov | G06F 21/64 |
| 2007/0055703 A1* | 3/2007 | Zimran | G06F 17/30123 |
| 2009/0089873 A1* | 4/2009 | Hepburn | H04L 63/0281 726/12 |
| 2010/0217837 A1* | 8/2010 | Ansari | G06Q 30/04 709/218 |

OTHER PUBLICATIONS

Leach, CIFS Logon and Pass Through Authentication Preliminary Draft, IETF (1997).*

Anderson, Global Namespace for Files, IBM Systems Journal, vol. 43, No. 4 (2004).*

* cited by examiner

COMMON INTERNET FILE SYSTEM PROXY AUTHENTICATION OF MULTIPLE SERVERS

CROSS-REFERENCE TO RELATED APPLICATIONS

This application is a continuation of co-pending U.S. patent application Ser. No. 12/403,284, filed Mar. 12, 2009. The aforementioned related patent application is herein incorporated by reference in its entirety.

BACKGROUND

Technical Field

Embodiments described in this disclosure generally relate to an application-level network protocol. More specifically, embodiments described in this disclosure relate to techniques for a network file system proxy to authenticate a client to multiple server systems providing shared access to resources on the server systems.

Description of the Related Art

The Common Internet File System (CIFS) and Server Message Block (SMB) standards provide data networking standards mainly used to provide shared access to files, printers, serial ports, and miscellaneous communications between nodes on a network. Other standards (e.g., NFS) provide similar capabilities. For example, CIFS may be used by a client device, such as a desktop computer, to access files from a shared folder on a remote computing system, commonly referred to as a server. CIFS allows users to access resources shared by the server system using CIFS in the same manner as resources physically attached to the client, e.g., a network drive accessed by the user in the same manner as a hard drive physically attached to the user's computer system.

Prior to accessing resources shared by a server using CIFS and SMB, users need to establish a CIFS session between the client system and the server system. Doing so typically includes a client authenticating itself to a service provider (e.g., a server configured to share files from specified folders or directories). The client supplies authenticating information (e.g., cryptographic tokens generated by the client from a username and password), and after validating the authenticating information, the server provides access to resources shared by the server.

SUMMARY

Embodiments described herein provide a Common Internet File System proxy for multiple CIFS servers. The CIFS proxy allows the multiple CIFS servers to appear to a client as a single CIFS server.

One embodiment includes a system having a processor and a memory containing a program, which, when executed on the processor is configured to perform an operation for authenticating a client device to a plurality of network servers. The operation may include establishing a session between the proxy system and a first network server, of the plurality, using an initial request supplied by a user of the client device. The request may include authenticating information used by the proxy system to authenticate the proxy system, as the client, to the first network server. The operation may further include sending a session timeout message to the client device which causes the client device to respond with a fresh authentication request, without prompting the user of the client device to provide the authenticating information. And also includes establishing a session between the proxy system and a second network server using the fresh authentication request.

In a particular embodiment, the process of establishing the session between the proxy system and the first network server comprises may itself include modifying the initial request to appear to the first network server as having originated from the proxy system, forwarding the modified request to the first network server to establish a session between the proxy system and the first network server, and receiving a response from the first network server. This process may also include modifying the response to appear to the client device as having originated from the proxy system; and forwarding the modified response to the client device.

The process of establishing the session between the proxy system and the second network server may itself include modifying the fresh authentication request to appear to the second network server as having originated from the proxy system, forwarding the modified request to the second network server to establish a session between the proxy system and the second network server, and receiving a response from the second network server establishing the session between the proxy system and the second network server.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments described herein include a proxy system configured to provide a client device with transparent access to multiple network file servers. In a particular embodiment, the proxy system provides a Common Internet File System (CIFS) proxy, which appears to the client device as a single CIFS server. In such an embodiment, the CIFS proxy may be configured to forward CIFS requests received from the client device to multiple CIFS servers as well as provide responses from the server back to the client. Further, the CIFS proxy may be configured to authenticate itself, as the client, to each of the CIFS servers using authentication credentials supplied by the client. However, the CIFS proxy does so without knowledge of the user's CIFS password. And further, the CIFS proxy causes the client device to prompt the user only once to authenticate themselves only once, via the proxy, rather than once for each CIFS server accessed by the CIFS proxy system.

In one embodiment, the CIFS proxy receives an initial authentication request from a CIFS client. In response, the CIFS proxy modifies the request to appear as though it originated from the CIFS proxy. The CIFS proxy then sends the modified authentication request to a first server that the CIFS proxy will access on behalf of the client. When the first CIFS server sends a reply to the CIFS proxy, the CIFS proxy modifies the response to that it appears to have been sent directly by the first CIFS proxy. Once modified, the CIFS proxy forwards the response to the client.

If the authentication process requires additional messaging between the client and the first CIFS server, the CIFS proxy continues to modify and forward requests between the client device and the first CIFS server until the authentication process in completed. Once completed, the first CIFS server has authenticated the CIFS proxy using the credentials supplied by the client. Thus, the CIFS proxy has an authenticated connection to the first CIFS server and can act as a proxy for the CIFS client.

If the CIFS proxy needs to access an additional CIFS server on behalf of the CIFS client, the CIFS proxy may be configured to send an error code to the CIFS client, resulting in the client resubmitting authentication credentials without prompting the user. For example, the CIFS proxy may send the error code defined by the CIFS standard of "STATUS_NETWORK_SESSION_EXPIRED" to the client device. Of course, other application-level network protocols may have error codes having a similar function. In response to receiving the STATUS_NETWORK_SESSION_EXPIRED error code, the client supplies a CIFS authentication request to the proxy. The CIFS proxy again modifies the authentication request to appear as though it originated from the CIFS proxy. The CIFS proxy then sends the modified CIFS authentication request to a second CIFS server that the proxy will access on behalf of the client. As with the first CIFS server, when the second CIFS server sends a reply to the CIFS proxy, the CIFS proxy modifies the response so that it appears to have originated from the CIFS proxy. The CIFS proxy then forwards the response to the client. The CIFS proxy continues to modify and forward requests between the client and the second CIFS server until the authentication process is complete.

Once completed, the CIFS proxy has an authenticated connection to the second CIFS server and can send CIFS request to the second server on behalf of the client. The process described to authenticate the second server may be repeated to allow the proxy to establish an authenticated session to any additional CIFS servers that the proxy desires to access on behalf of the client.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s).

Additionally, as noted above, some embodiments may be implemented for use with the known CIFS network protocol using particular error codes and functions defined by the CIFS standard. Of course, one of ordinary skill in the art will recognize that embodiments may be adapted for use with other network protocols used by a server to share resources to clients over a network or use with other network protocols which provide similar error codes and/or functionality to the CIFS standard.

Figure 1:
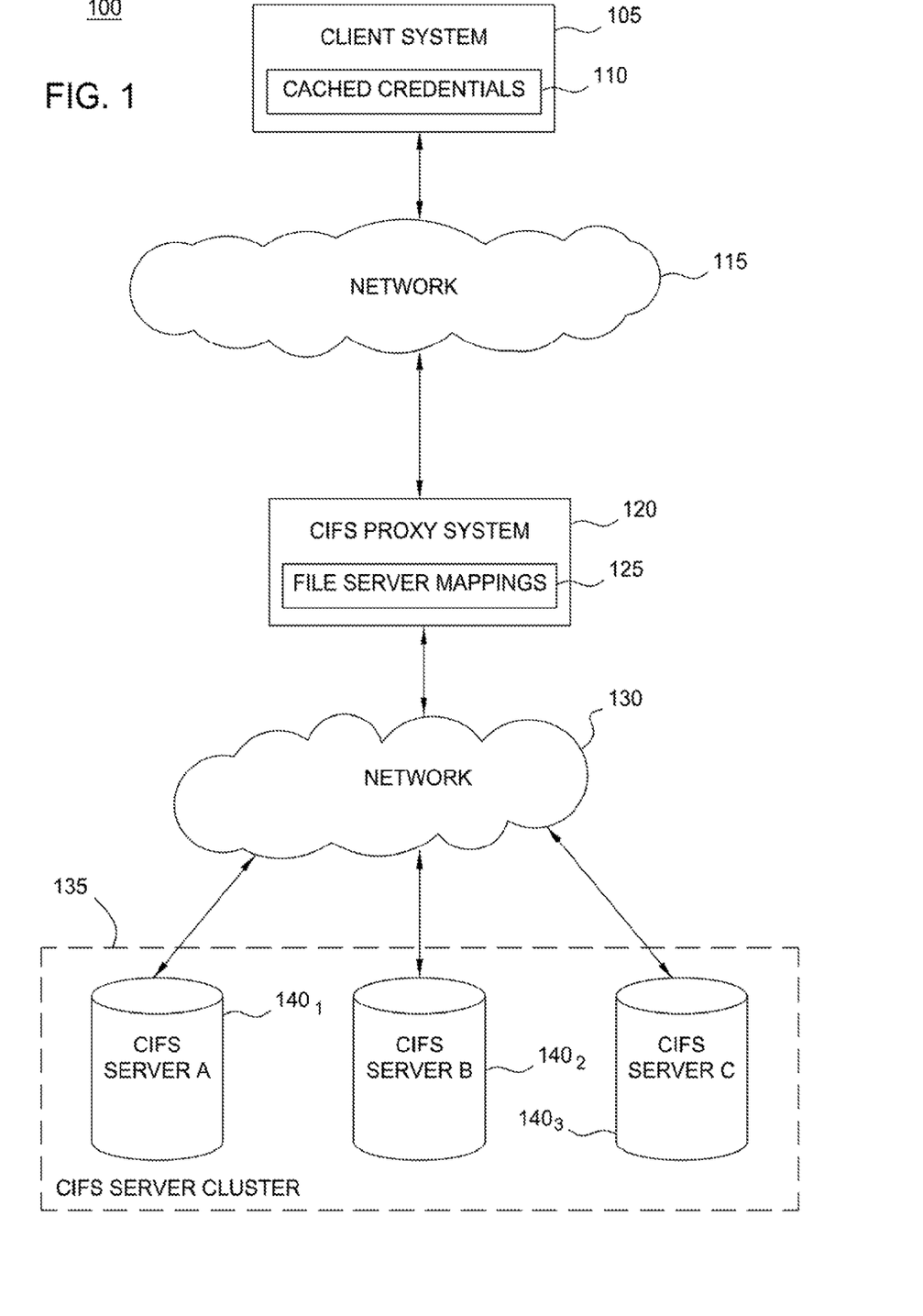
FIG. 1 is a block diagram illustrating an example computing environment, configured according to one embodiment.

FIG. 1 is a block diagram illustrating an example computing environment 100 configured according to one embodiment. As shown, the computing environment 100 includes a client device 105 connected to a network 115. Also connected to network 115 is CIFS proxy system 120. Further, CIFS 120 is also shown connected to network 130. Note, networks 115 and 130 are shown as being distinct from one another for clarity and could in practice be the same network. Also connected to network 130 is CIFS server cluster 135. Illustratively, CIFS server cluster 135 includes three independent CIFS file servers; namely CIFS Server A $140_1$, CIFS Server B $140_2$, and CIFS Server C $140_3$. In this example, each of CIFS servers $140_{1-3}$ represent an independent file server with some portion of a file system to be shared with CIFS clients.

Client system 105 represents a computing system having a processor and a memory. For example, client system 105 may in practice be a personal desktop or laptop computing system. However, other devices such as handheld devices, mobile phones, gaming systems are also contemplated. In one embodiment, the client system 105 is configured with the appropriate client software used to connect to resources shared over a network, e.g., files, printers, serial ports, etc. For example, client system 105 may include CIFS client software used to authenticate itself to a CIFS server.

CIFS proxy system 120 may be a computing system having a processor and a memory. CIFS proxy system may be generally be configured to provide the client system 105 with transparent access to multiple network file servers (e.g., the servers of CIFS server cluster 135). Illustratively, the CIFS proxy system 120 includes a set of fileserver mappings 125. In one embodiment, the fileserver mappings 125 define what resources may be accessed by the client system 105 using the proxy system 120, and how such resources 120 map to actual resources on the CIFS server cluster 135. For example, one of the fileserver mappings 125 may define a network drive accessible to users of client system 105. In such a case, the fileserver mapping 125 specifies what physical drives and folders on CIFS servers $140_{1-3}$ of the server cluster 135 should be mapped to the network drive.

In one embodiment, users interact with the client system 105 to establish a session with the CIFS proxy system 120. Once established, the client system 105 may access resources (e.g., a shared network file system) by sending CIFS requests to the proxy, which, in turn, forwards the requests to an actual CIFS file server (e.g., one of servers $140_{1-3}$). Similarly, responses received from the CIFS file servers are forwarded back to the client system 105. Thus, to the client system 105, the proxy appears as the actual CIFS server.

Part of establishing a session with the CIFS proxy system may include authenticating the user. For example, the user may be prompted to supply a username and password combination (or other authenticating information). As stated above, the CIFS proxy system 120 may be configured modify the users responses to the authentication process and forward them towards the actual CIFS file server. Further, once the user has provided their authentication data, the client software may retain a copy of the authentication data, represented in FIG. 1 as cached credentials 110. In one embodiment, the cached credentials may be used by the client system 105 to respond to an error code sent from the CIFS proxy system 120, e.g., the STATUS_NETWORK_SESSION_EXPIRED error code mentioned above. Doing so may cause the client system 105 to send a fresh authentication request to the CIFS proxy system without prompting the user. The CIFS proxy system 120 may use the fresh authentication request to establish additional sessions with the CIFS servers $140_{1-3}$ in CIFS server cluster.

Figure 2:
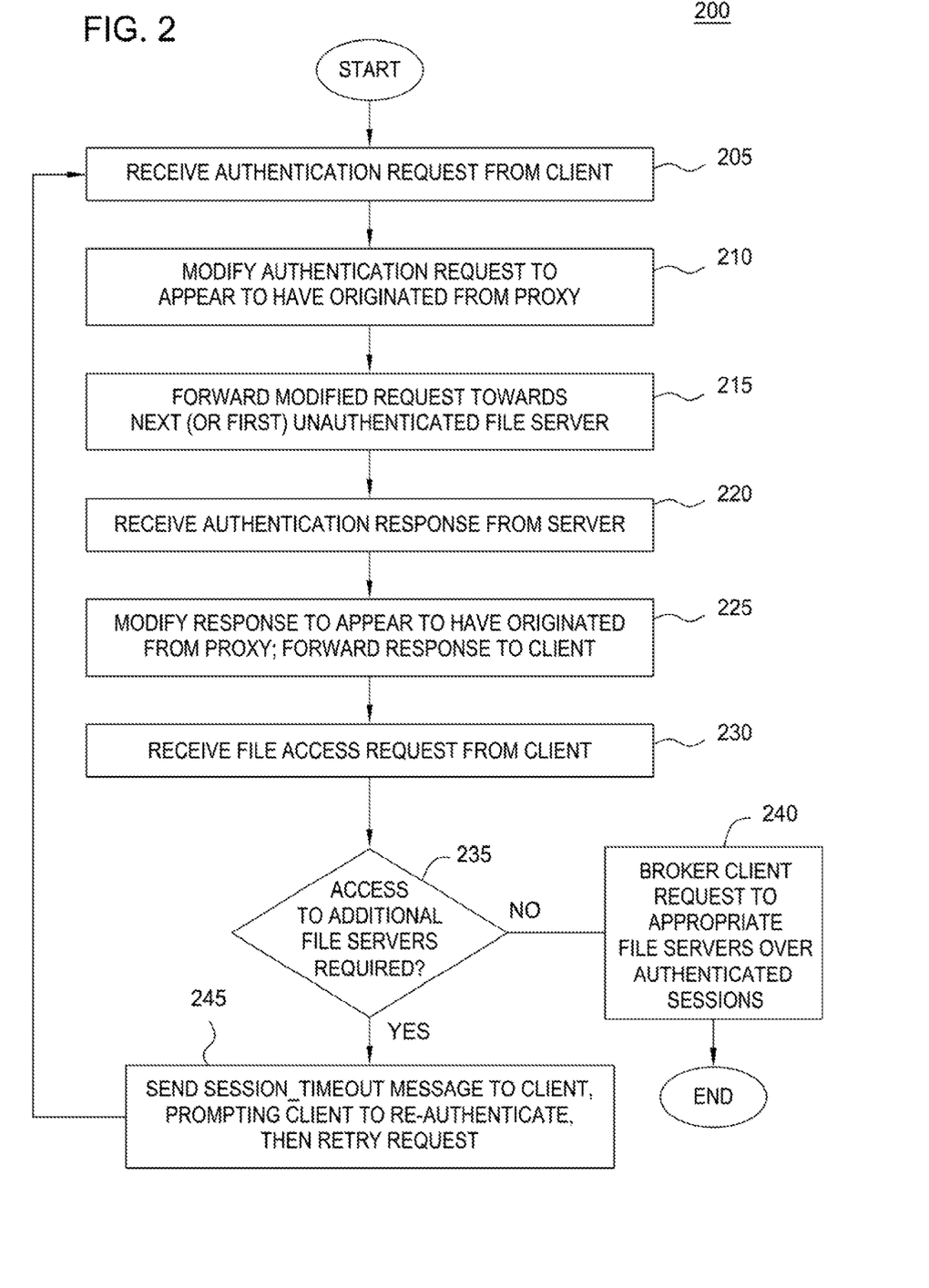
FIG. 2 is a flow chart illustrating a method for a CIFS proxy to authenticate a client device to multiple network file servers, according to one embodiment described in this disclosure.

FIG. 2 is a flow chart illustrating a method for a CIFS proxy to authenticate a client device to multiple network file servers, according to one embodiment described in this disclosure. As shown, the method 200 begins at step 205 where the CIFS proxy system 120 receives an authentication request from the client system 105. For example, the client system 105 may request access to a folder available from a network drive and supply a username and password as part of the request (or information generated therefrom). Note, the CIFS proxy system 120 may also negotiate certain capabilities with the client for network communications. For example, the CIFS proxy system 120 may negotiate to disable SMB signing. At step 210, the CIFS proxy system 120 modifies the authentication request to appear to have originated from the CIFS proxy system 120. For example, the CIFS proxy system 120 may replace an indication of the source of the request as being from the client system 105 to being from the CIFS proxy system 120. In other cases, the CIFS proxy system 120 may use the credentials supplied by the user (e.g., the username and password supplied by the client) to generate a new authentication request, allowing the CIFS proxy system 120 to masquerade as the client to an actual CIFS server.

At step 215, the CIFS proxy system 120 forwards the modified request toward the next (or the first) unauthenticated file server (e.g., one of servers $140_{1-3}$). Once received, the network file server processes the request as though it had been sent directly by the CIFS proxy system 120. At step 220, the CIFS proxy system 120 receives a response from the network server. At step 225, the CIFS proxy system 120 modifies the response to appear to have originated from the network server and forwards the modified response back to the client system 105. Once received, the client system 105 processes the response as though received directly from the network server.

If the authentication process requires additional messaging between the client and the network server, the CIFS proxy system 120 continues to modify and forward requests between the client device and the network server until the authentication process in completed. Throughout this process, the CIFS proxy system 120 appears to the client system at all times as though it were the actual network server and appears to the network server as though it were the client. Further, once steps 205-225 are completed, CIFS proxy system 120 has an authenticated session between itself and the network server and may respond to requests for access to resources on that server submitted by the client system.

At step 230, the CIFS proxy system 120 receives a file access request from the client system 105. As noted above, in some cases the CIFS proxy system 120 may require access to additional network servers in order to process the file access request received from the client system 105. For example, assume that the client has established a connection to map a network drive on the network server. In some cases, however, the actual files for that network drive may be spread across multiple backend server systems. Thus, in such cases, the proxy needs to establish a session with each independent system from which resources may be required.

Accordingly, at step 235, the CIFS proxy system 120 may determine whether access to additional servers is required. In one embodiment, the CIFS proxy system 120 may delay authenticating to additional servers until a request is received that requires access to a second server (or third server, etc.). Alternatively, the CIFS proxy system 120 may create an authenticated session to multiple servers up front—without waiting for an actual request that requires access to resources on a second server. If access to additional servers is not required to process the access request received at step 230, then at step 240 the CIFS proxy system 120 brokers client requests for access to resources over the session established as part of steps 205-225 (i.e., the resources for that session may reside solely on a single server (or a group of servers) to which the client has previously been authenticated).

Otherwise, if access to additional servers is required, the CIFS proxy system 120 may send a session time out message to the to the client system, causing the client to submit a fresh authentication request using a copy of the credentials cached when the first session was established (step 245). For example, for an embodiment implemented using the CIFS standard, the STATUS_NETWORK_SESSION_EXPIRED error code may be used. For other network protocols or standards, error codes with a similar functionality may be used. Once received, the CIFS proxy system 120 modifies the request to appear as having originated from the CIFS proxy system 120. That is, the CIFS proxy system 120 may repeat the process described for steps 210-225 to establish an authenticated session on a second network server. Because the error code STATUS_NETWORK_SESSION_EXPIRED results in a fresh authentication message from the client, without also prompting the user, this approach results in additional CIFS sessions being established without intervention or action from the user of the client system.

After sending the session timeout message, the method 200 returns to step 205 where the CIFS proxy system 120 establishes a session with an additional backend server (steps 205-230). At this point, the CIFS proxy system 120 retries the client request (received again at step 230), if sessions with additional backend servers is required, this process (steps 205-203) may be repeated for as many servers as needed for the client system to access resources on multiple backend network servers.

Figure 3A:
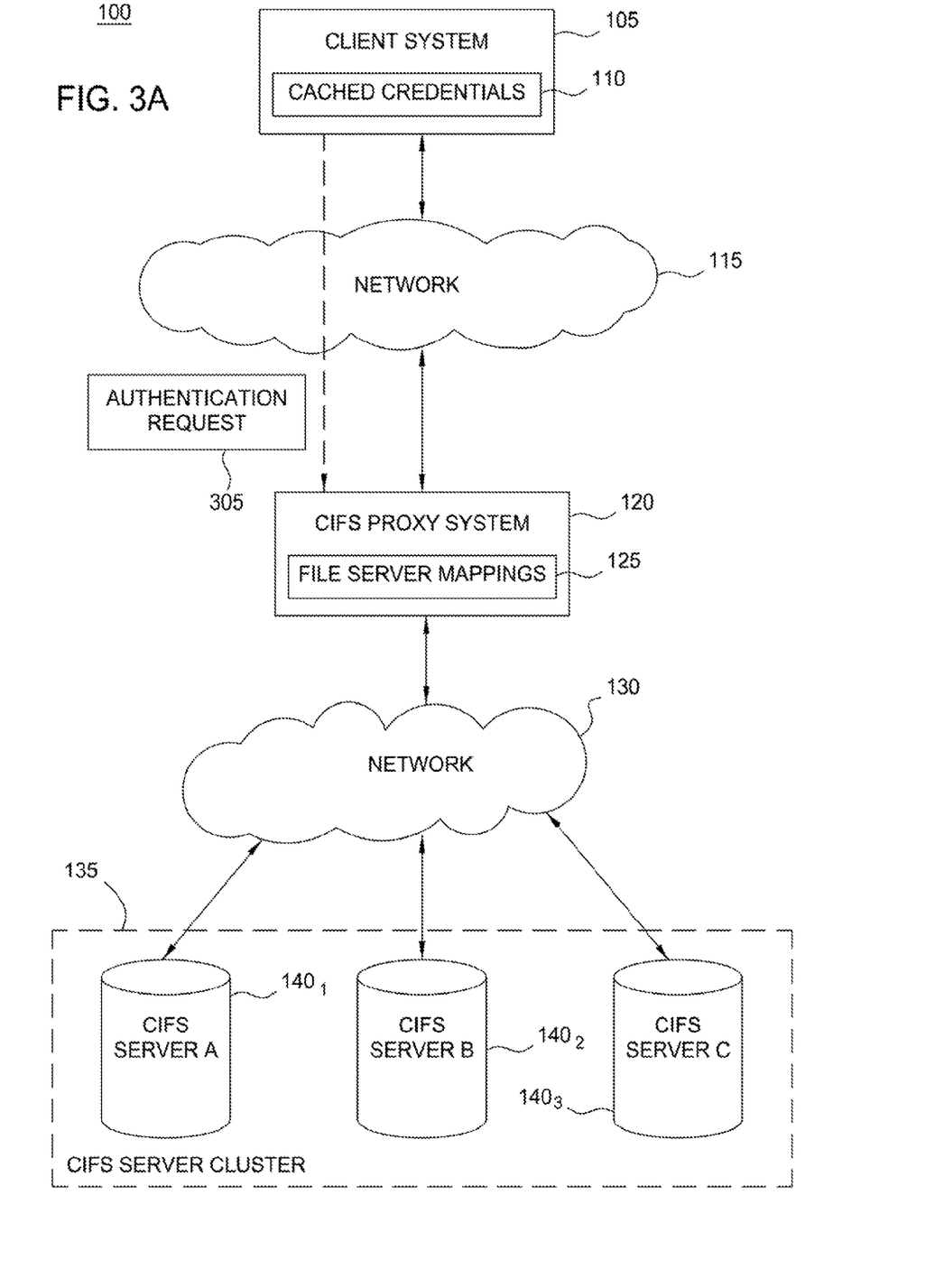
FIGS. 3A-3H illustrate an example of a CIFS proxy authenticating a client device to three separate CIFS servers, according to one embodiment described in this disclosure.
Figure 3B:
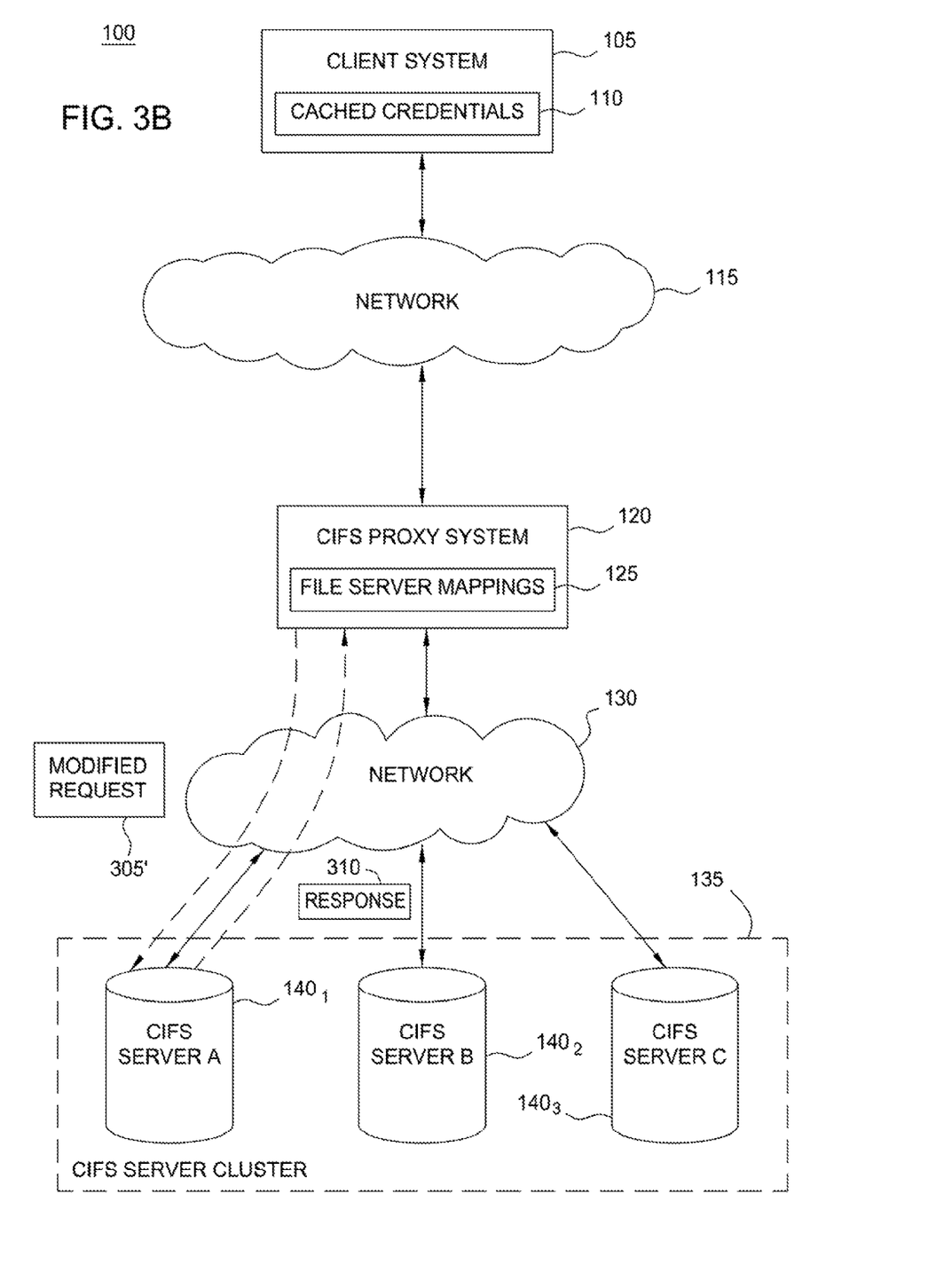
Figure 3C:
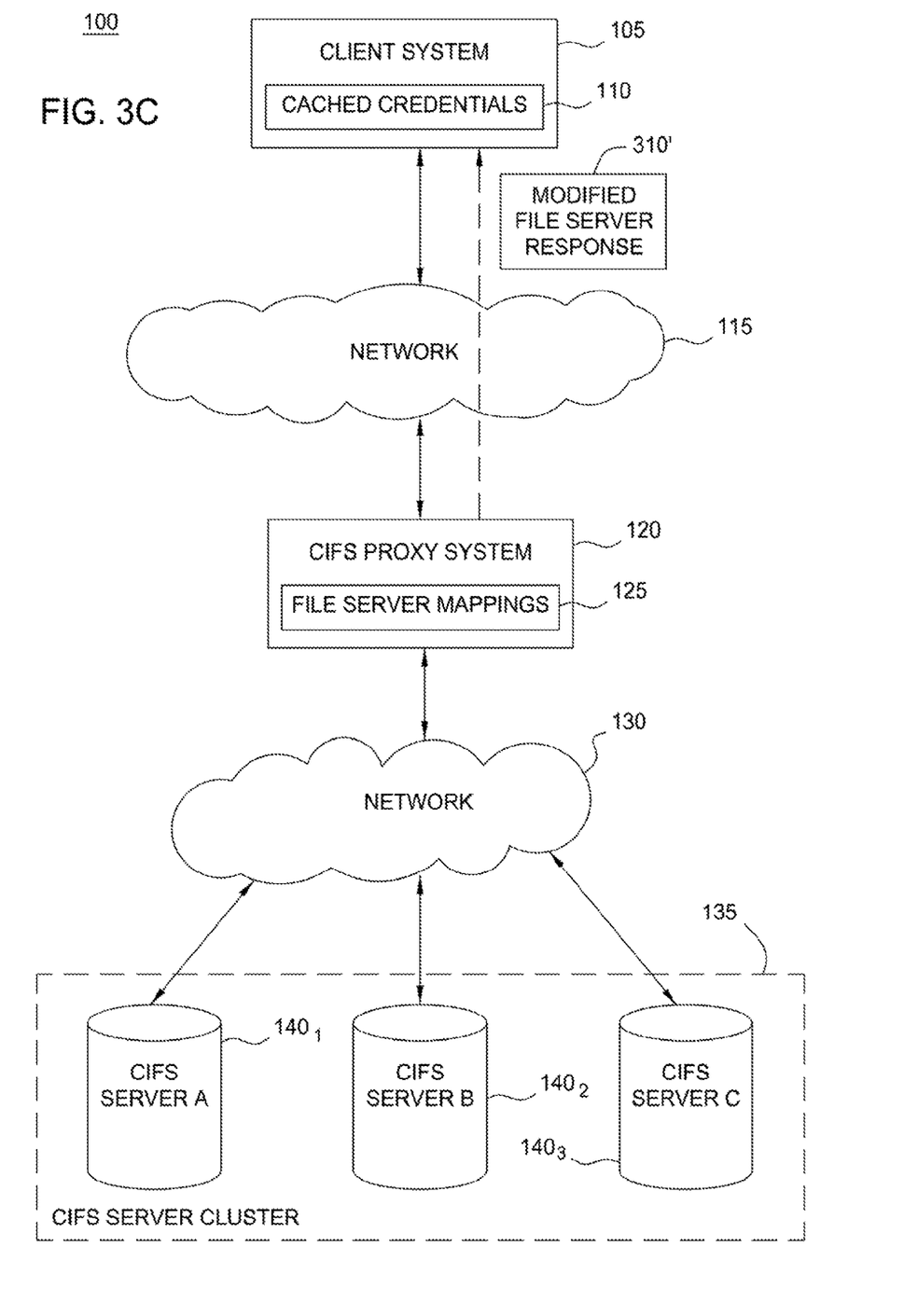

FIGS. 3A-3H illustrate an example of the CIFS proxy system 120 authenticating a client system 120 to three separate CIFS servers, according to one embodiment described in this disclosure. As shown in FIG. 3A, the client system 105 submits an authentication request 305 to the CIFS proxy system 120. For example, the user may request to establish a CIFS connection to the proxy system and be prompted for the appropriate credentials (e.g., a username and password). Once received, the CIFS proxy system 120 modifies the request to appear as having originated from the proxy system directly (i.e., the CIFS proxy system 120 appears to the CIFS server as though it were the client system 105). For example, FIG. 3B illustrates the modified request 305' being forwarded to the CIFS server A $140_1$. In response, the CIFS server A $140_1$ sends a response 310 back to the CIFS proxy system 120. Once received, the CIFS proxy system 120 modifies the response to appear as having originated from the proxy system directly (i.e., the CIFS proxy system 120 appears to the client system 105 as though it were the CIFS server A $140_1$). For example, FIG. 3C illustrates the modified response 310' being forwarded to the CIFS server A $140_1$.

Figure 3D:
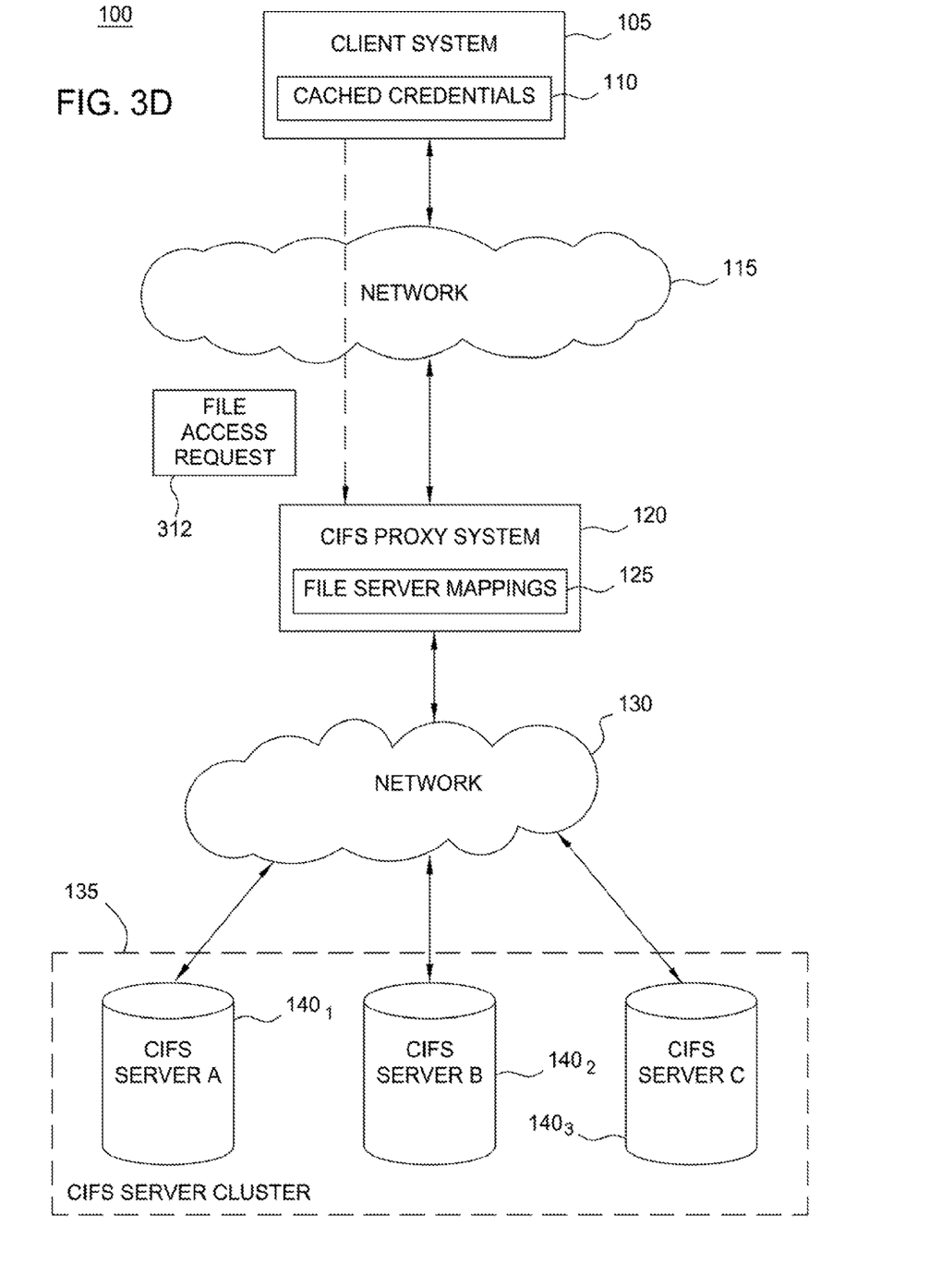
Figure 3E:
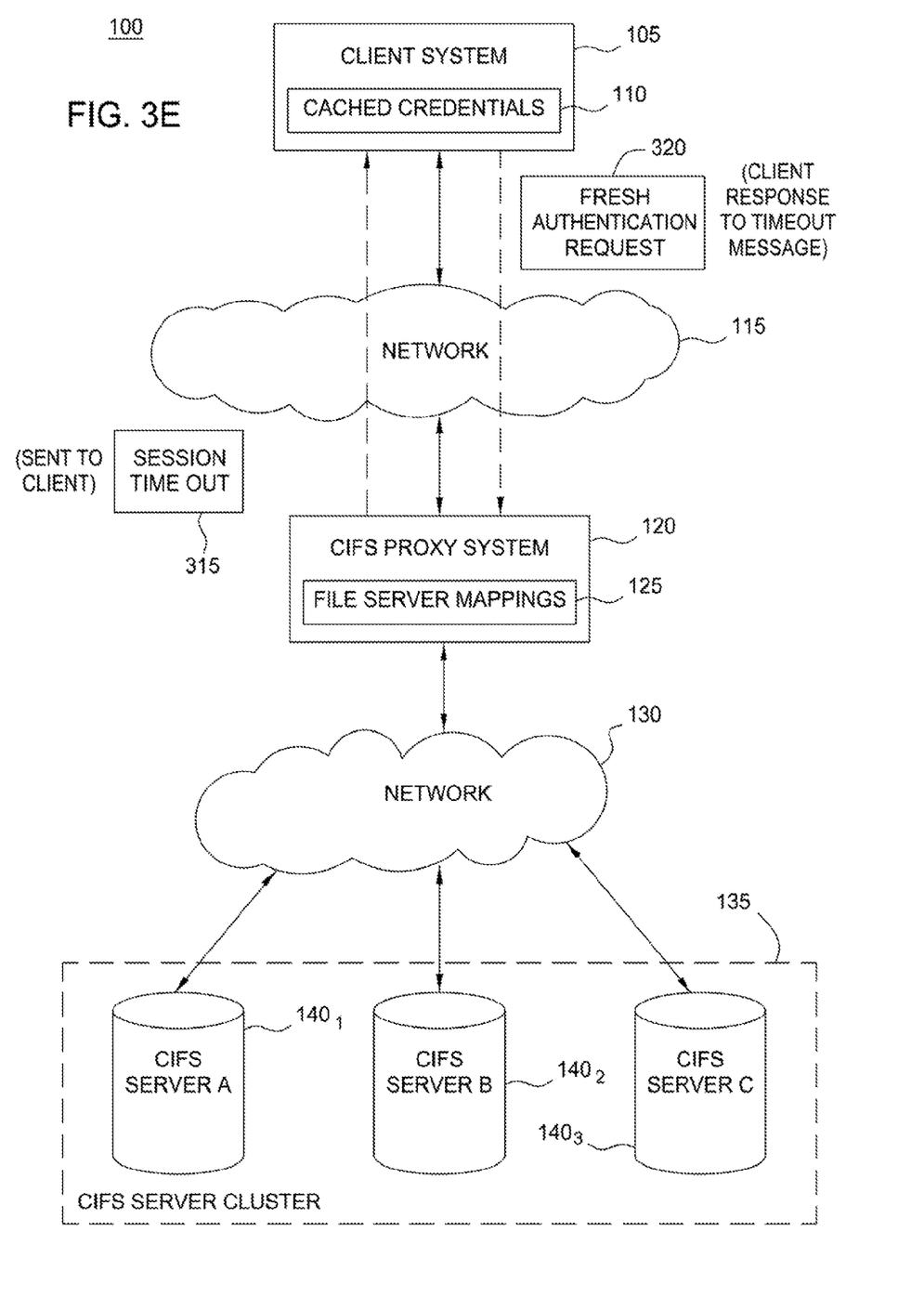
Figure 3F:
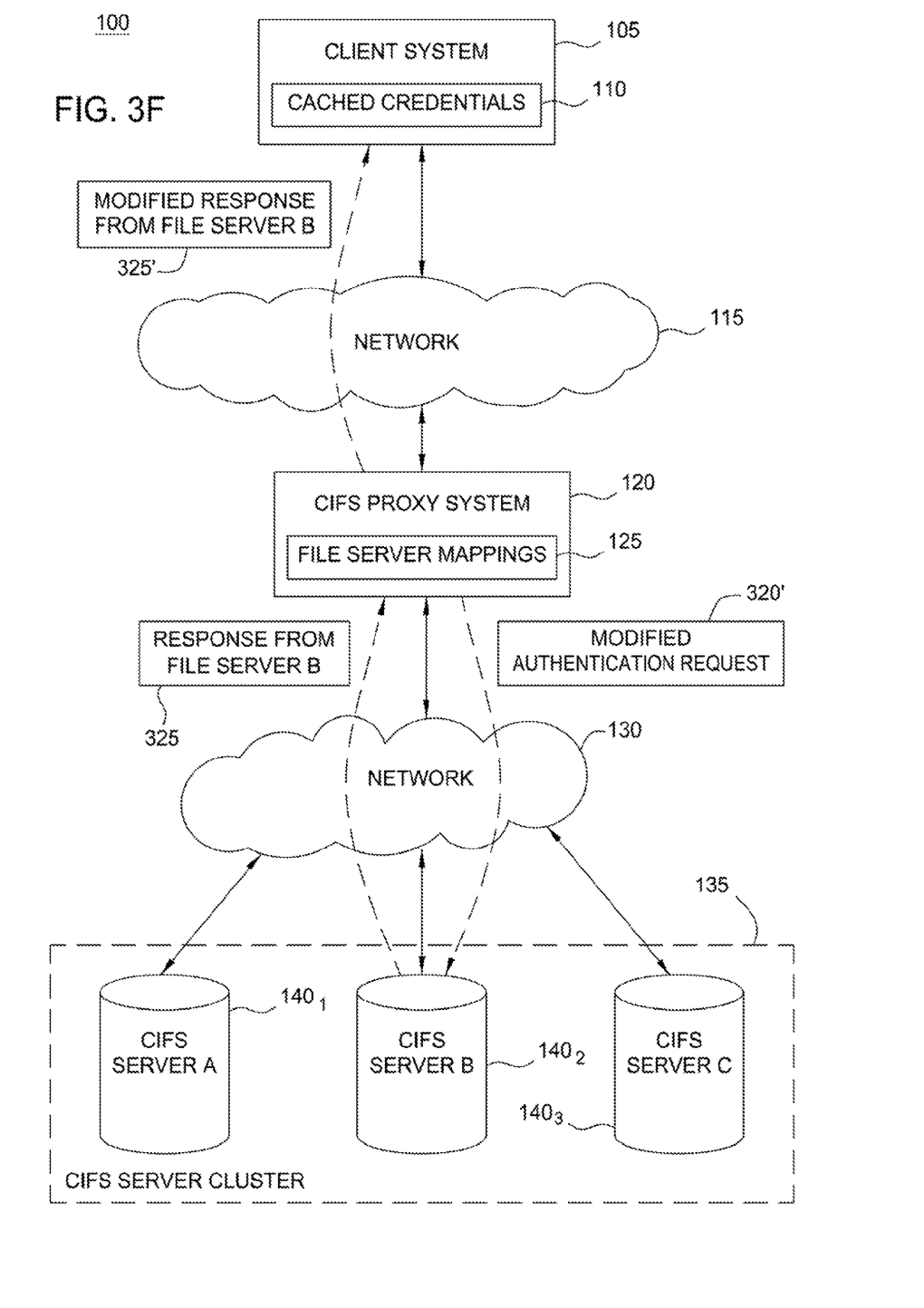

At this point the CIFS proxy system 120 has established an authenticated session with the CIFS server A 140$_1$, and may broker requests for access to resources on this CIFS server. However, the client system 105 may request files stored on either CIFS server B 140$_2$ or CIFS server C 140$_3$. For example, FIG. 3D shows the CIFS proxy system 120 receiving a file access request 312 for access to resources stored on CIFS server cluster 135. For this example, assume the CIFS proxy system 120 requires access to resources on CIFS server B 140$_2$ to process the file access request 312. However, the CIFS proxy system 120 has only a single authenticated session with CIFS server A 140$_1$. FIGS. 3E-3F provide an example of the CIFS proxy system 120 establishing connections with CIFS server B 140$_2$.

FIG. 3E shows sending a session timeout message 315 to the client system 105 (e.g., the STATUS_NETWORK_SESSION_EXPIRED error code). As stated, the session timeout message 315 is sent after file access 312 request is received which requires the CIFS proxy system to access additional servers in the server cluster 135. In response to the session time out message 315, the client system 105 sends a fresh authentication request 320 to the CIFS proxy system 120.

Once received, the CIFS proxy system 120 modifies the authentication request 320 so as to appear as being from the proxy system 120 and uses the modified request to authenticate itself (as the client system 105) to the CIFS server B 140$_2$. For example, FIG. 3F illustrates the CIFS proxy system 120 sending a modified request 320' to the CIFS server B 140$_2$. In response, the CIFS server B 140$_2$ sends a response 325 back to the CIFS proxy system 120. The CIFS proxy system 120 modifies the response 325 to appear to have originated from the CIFS proxy system 120, and sends the modified response 325' to the client system 105. At this point, in addition to the session with CIFS server A 140$_1$, CIFS proxy system 120 has established an authenticated session with the CIFS server B 140$_2$. Thus, the CIFS proxy system 120 may broker requests for access to resources on both of these CIFS servers. Importantly, the session with CIFS server B 140$_2$ is established without requiring the user to resubmit any authenticating credentials or information directly and instead is performed using the session timeout message 315 and cached credentials 110.

The process for the CIFS proxy system 120 to establish a session with CIFS server C 140$_3$ proceeds in a similar manner. For example, assume the file access request 312 from FIG. 3D also requires access to resources present on CIFS server C 140$_3$ to process. Alternatively, the client system 105 may submit another file access request which requires access to resources on CIFS server C 140$_3$. In such cases, the CIFS proxy system 120 sends a second timeout message to the client system 105, resulting in another authentication exchange between the client system 105 and the CIFS proxy system 120. And as before, the CIFS proxy system 120 modifies the client response to appear to have originated from the proxy system 120 and uses it to authenticate itself to the CIFS server 140$_3$. The CIFS proxy system 120 then modifies a response received from the CIFS server 140$_3$ server to appear to have originated from the proxy system 120 and sends this to the client system 105.

Figure 3G:
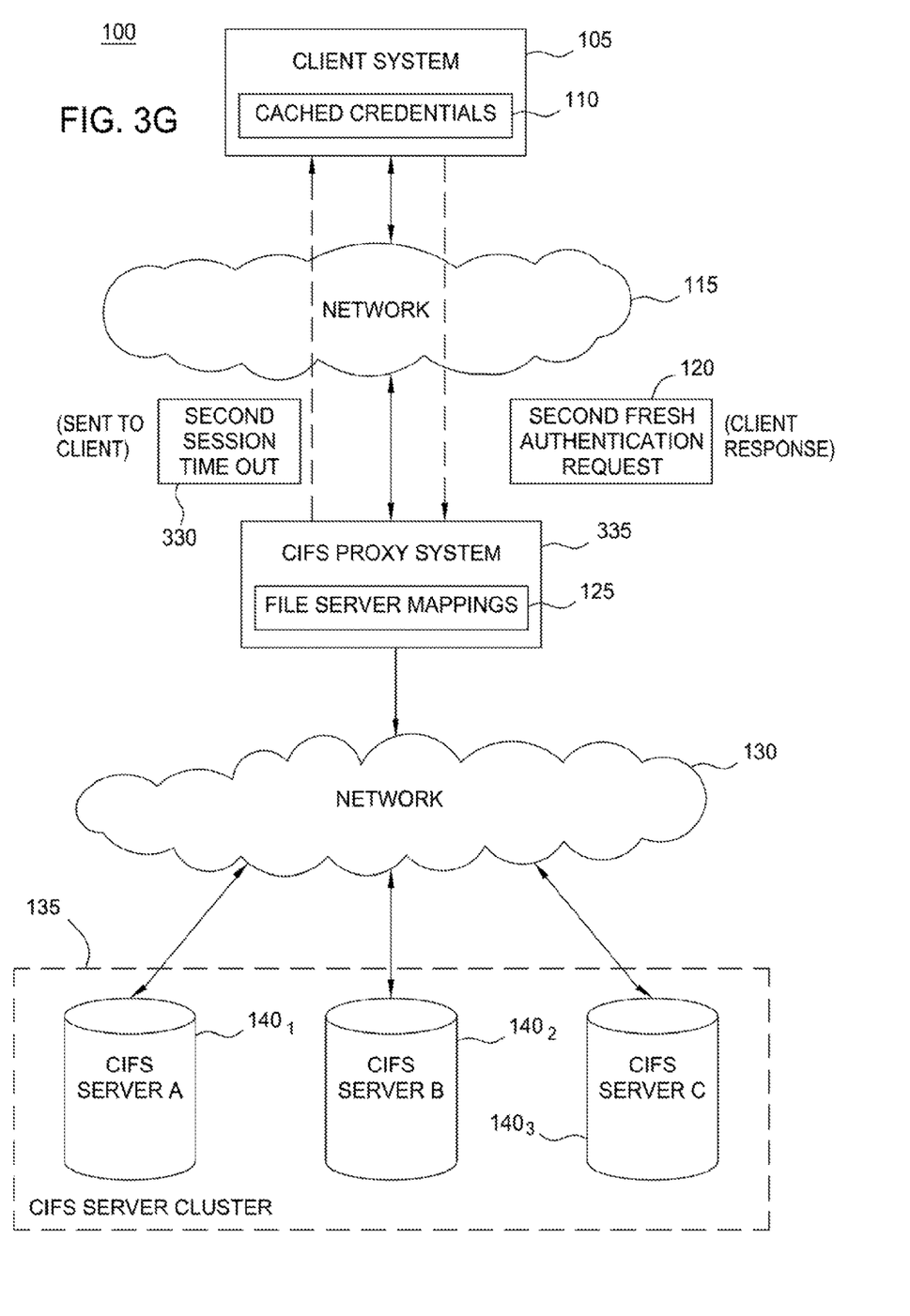
Figure 3H:
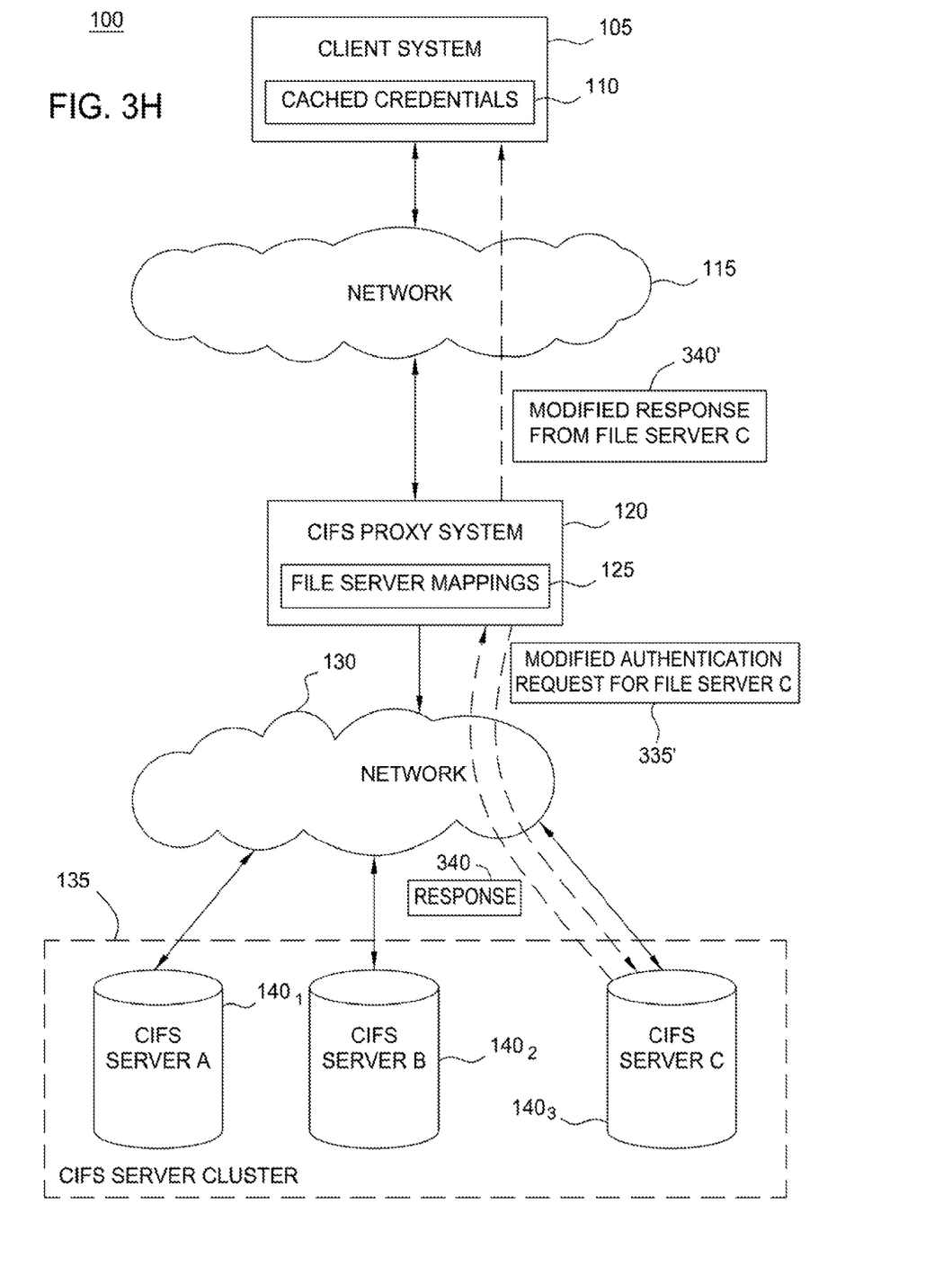

This result is shown in FIGS. 3G-3H. FIG. 3G shows the CIFS proxy system 120 sending a second session timeout message 330 to the client system 105 (e.g., the STATUS_NETWORK_SESSION_EXPIRED error code). In response the client system 105 sends a second fresh authentication request 335 to the CIFS proxy system 120. And FIG. 3H shows the CIFS proxy system 120 sending a modified request 335' to the CIFS server C 140$_3$. In response, the CIFS server C 140$_3$ sends a response 340 back to the CIFS proxy system 120. The CIFS proxy system 120 then modifies the response 340 to appear to have originated from the CIFS proxy system 120, and sends the modified response 340' to the client system 105. At this point the CIFS proxy system 120 has established an authenticated session with the CIFS server C 140$_3$ and may broker requests for access to resources on any of CIFS servers 140$_{1-3}$, while having only prompted the user a single time to establish the initial session with CIFS Server A 140$_1$. That is, like the session established with CIFS server B 140$_2$, the session with CIFS server C 140$_3$ is established without requiring the user to resubmit any authenticating credentials or information directly and instead is performed using the session timeout message 330 and cached credentials 110. The CIFS proxy system 120 may repeat this process as needed to establish an authenticated session with any number of additional back-end servers.

Advantageously, embodiments described herein include a proxy system configured to provide a client device with transparent access to multiple network file servers. In a particular embodiment, the proxy system provides a Common Internet File System (CIFS) proxy, which appears to the client device as a single CIFS server. In such an embodiment, the CIFS proxy may be configured to forward CIFS requests received from the client device to multiple CIFS servers as well as provide responses from the server back to the client. Further, the CIFS proxy may be configured to authenticate itself, as the client, to each of the CIFS servers using authentication credentials supplied by the client. However, the CIFS proxy does so without knowledge of the user's CIFS password. And further, the CIFS proxy causes the client device to prompt the user only once to authenticate themselves only once, via the proxy, rather than once for each CIFS server accessed by the CIFS proxy system.

While the foregoing is directed to embodiments of the present disclosure, other and further embodiments of the disclosure may be devised without departing from the basic scope thereof, and the scope thereof is determined by the claims that follow.

The invention claimed is:

1. A proxy system, comprising:
   a processor; and
   a memory containing a program, which, when executed on the processor is configured to perform an operation for authenticating a client device to a plurality of network servers, the operation comprising:
   establishing a first session between the proxy system and a first network server, of the plurality of network servers, using an initial request supplied by the client device, wherein the request includes authenticating information used by the proxy system to authenticate the proxy system, as the client device, to the first network server;
   determining the client device has requested access to resources on a second network server of the plurality of network servers;
   sending a session timeout message to the client device which causes the client device to respond with a fresh authentication request, without prompting, at the client device, to provide the authenticating information; and
   establishing a second session between the proxy system and the second network server using the fresh authentication request.

2. The system of claim 1, wherein establishing the first session between the proxy system and the first network server comprises:
   modifying the initial request to appear to the first network server as having originated from the proxy system;
   forwarding the modified request to the first network server to establish a session between the proxy system and the first network server;
   receiving a response from the first network server;
   modifying the response to appear to the client device as having originated from the proxy system; and
   forwarding the modified response to the client device.

3. The system of claim 1, wherein establishing the second session between the proxy system and the second network server comprises:
   modifying the fresh authentication request to appear to the second network server as having originated from the proxy system;
   forwarding the modified request to the second network server to establish a session between the proxy system and the second network server; and
   receiving a response from the second network server establishing the second session between the proxy system and the second network server.

4. The system of claim 1, wherein the proxy system is configured as a common internet file system (CIFS) proxy, and wherein each of the plurality of network file servers is configured as a CIFS server system.

5. The system of claim 4, wherein the session timeout message is a CIFS STATUS_NETWORK_SESSION_EXPIRED error code.

6. The system of claim 4, wherein the proxy system is configured to negotiate with the client device to disable server message block (SMB) signing.

7. The system of claim 1, wherein the first and second sessions between the proxy system and the first and second network servers provide access to one or more storage devices presented to the client device as a network drive on the proxy system.

8. A method for authenticating a client device to a plurality of network servers, comprising:
   establishing a first session between the proxy system and a first network server, of the plurality of network servers, using an initial request supplied by the client device, wherein the request includes authenticating information used by the proxy system to authenticate the proxy system, as the client device, to the first network server;
   determining the client device has requested access to resources on a second network server of the plurality of network servers;
   sending a session timeout message to the client device which causes the client device to respond with a fresh authentication request, without prompting, at the client device, to provide the authenticating information; and
   establishing a second session between the proxy system and the second network server using the fresh authentication request.

9. The method of claim 8, wherein establishing the first session between the proxy system and the first network server comprises:
   modifying the initial request to appear to the first network server as having originated from the proxy system;
   forwarding the modified request to the first network server to establish a session between the proxy system and the first network server;
   receiving a response from the first network server;
   modifying the response to appear to the client device as having originated from the proxy system; and
   forwarding the modified response to the client device.

10. The method of claim 8, wherein establishing the second session between the proxy system and the second network server using the fresh authentication request, comprises:
    modifying the fresh authentication request to appear to the second network server as having originated from the proxy system;
    forwarding the modified request to the second network server to establish a session between the proxy system and the second network server; and
    receiving a response from the second network server establishing the second session between the proxy system and the second network server.

11. The method of claim 8, wherein the proxy system is configured as a common internet file system (CIFS) proxy, and wherein each of the plurality of network file servers is configured as a CIFS server system.

12. The method of claim 11, wherein the session timeout message is a CIFS STATUS_NETWORK_SESSION_EXPIRED error code.

13. The method of claim 11, wherein the proxy system is configured to negotiate with the client device to disable server message block (SMB) signing.

14. The method of claim 8, wherein the first and second sessions between the proxy system and the first and second network servers provide access to one or more storage devices presented to the client device as a network drive on the proxy system.

15. A non-transitory computer-readable storage-medium containing a routing program which, when executed on a processor, performs an operation for authenticating a client device to a plurality of network servers, the operation comprising:
    establishing a first session between the proxy system and a first network server, of the plurality of network servers, using an initial request supplied by the client device, wherein the request includes authenticating information used by the proxy system to authenticate the proxy system, as the client, to the first network server;
    determining the client device has requested access to resources on a second network server of the plurality of network servers;
    sending a session timeout message to the client device which causes the client device to respond with a fresh authentication request, without prompting, at the client device, to provide the authenticating information; and
    establishing a second session between the proxy system and the second network server using the fresh authentication request.

16. The computer-readable storage-medium of claim 15, wherein establishing the first session between the proxy system and the first network server comprises:
    modifying the initial request to appear to the first network server as having originated from the proxy system;
    forwarding the modified request to the first network server to establish a session between the proxy system and the first network server;
    receiving a response from the first network server;
    modifying the response to appear to the client device as having originated from the proxy system; and
    forwarding the modified response to the client device.

17. The computer-readable storage-medium of claim 15, wherein establishing the second session between the proxy system and the second network server comprises:
- modifying the fresh authentication request to appear to the second network server as having originated from the proxy system;
- forwarding the modified request to the second network server to establish a session between the proxy system and the second network server; and
- receiving a response from the second network server establishing the second session between the proxy system and the second network server.

18. The computer-readable storage-medium of claim 15, wherein the proxy system is configured as a common internet file system (CIFS) proxy, and wherein each of the plurality of network file servers is configured as a CIFS server system.

19. The computer-readable storage-medium of claim 18, wherein the session timeout message is a CIFS STATUS_NETWORK_SESSION_EXPIRED error code.

20. The computer-readable storage-medium of claim 18, wherein the proxy system is configured to negotiate with the client device to disable server message block (SMB) signing.

21. The computer-readable storage-medium of claim 15, wherein the first and second sessions between the proxy system and the first and second network servers provide access to one or more storage devices presented to the client device as a network drive on the proxy system.

\* \* \* \* \*